Figure 1:
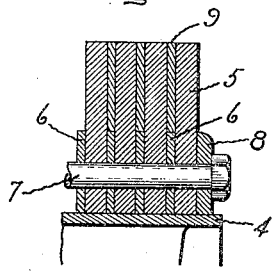

K. ALQUIST.
METHOD OF MANUFACTURING ELASTIC HELICAL GEARS.
APPLICATION FILED FEB. 18, 1914.

1,165,933.

Patented Dec. 28, 1915.

Witnesses:

Inventor:
Karl Alquist,
by
His Attorney

UNITED STATES PATENT OFFICE.

KARL ALQUIST, OF SCHENECTADY, NEW YORK.

METHOD OF MANUFACTURING ELASTIC HELICAL GEARS.

1,165,933.	Specification of Letters Patent.	Patented Dec. 28, 1915.

Application filed February 18, 1914. Serial No. 819,480.

*To all whom it may concern:*

Be it known that I, KARL ALQUIST, a subject of the King of Sweden, residing at Schenectady, county of Schenectady, State of New York, have invented certain new and useful Improvements in Methods of Manufacturing Elastic Helical Gears, of which the following is a specification.

The present invention relates to elastic helical gears and is a continuation of my application Serial No. 639,210, filed July 18, 1911, in so far as it discloses subject matter embodied in such application.

In said application I have described various forms of elastic helical gears and methods of making the same, said gears being so constructed that the teeth will bend or yield elastically under tooth pressure in a lateral direction to compensate for small inaccuracies in construction or in axial alinement of the driving and driven gears, it being well known that no matter how accurately such gears may be cut there will be small inaccuracies on the working faces of the teeth due chiefly to the effects of the cutting tool. The problem of making such gears is a difficult one, especially with gears intended to operate at high speeds and transmit large powers, as for example in transmitting power from an elastic fluid turbine to the rotor of an electric generator or to a propelling shaft for a ship.

I have invented or discovered a method of making such gears which is of such a simple character that it can be practised in an ordinary machine shop which is equipped with the usual gear cutting apparatus.

In manufacturing my improved gearing I assemble on a shaft or other support a plurality of circular disks or plates of suitable metal and of the desired thickness, the thickness of each plate and the number thereof depending upon the work to be performed by the finished gear. Between the plates and closely surrounding the shaft are suitable spacing devices or rings which may be separately formed or they may be formed as a part of the plate itself, as will be evident on further consideration. These may be termed permanent spacing means or devices. Surrounding these rings and located between adjacent plates are other and removable or destructible spacing devices, which are of service only to back up the plates when the teeth of the gear are being cut. These destructible devices or rings may be made of paper or of metal as will appear later, and for the purpose of distinction may be referred to as temporary spacing means or devices. The plates and spacing rings are or may be held between heavy end plates and said plates and inner spacing rings are securely held in place either by applying heavy end pressure, as by a nut and screw, in line with said inner rings, or by bolts that extend axially through the plates and inner rings and usually through the end plates as well. After the gear blank is thus built up and machined to size the helical teeth are cut as accurately as possible by any suitable gear cutting machine. After the cutting operation the next step is to remove or destroy said outer spacing rings or devices without disturbing the assembled gear. If these outer spacing and destructible rings are made of paper they will stand up during the tooth cutting operation and that is all that is required of them. They may be removed in any suitable way. For example, the gear with the paper spacing rings may be driven under load for a short time when the paper will be destroyed by the rubbing action of and the pressure of one plate on the other. As an alternative I may subject the gear to a mild heating which carbonizes the paper and causes disintegration thereof.

When metal is employed as the removable or destructible outer spacing devices or rings I may separate one device from the other, as for example by using a metal ring composed of segmental pieces, the joints of which commonly abut. These segments are afterward removed by centrifugal force by rotating the gear at a relatively high speed. As an alternative when the construction permits I may first force the segments outwardly a short distance by a suitable tool acting on their inner surfaces and then pull them out by another tool. They may also be removed by any suitable cutting tool.

The destructible spacing devices or rings serve during the cutting operation to prevent the plates from springing with respect to each other during the cutting operation and also to prevent the cutting tool from forming burrs on the edges of the teeth of the individual plates.

Figure 2:
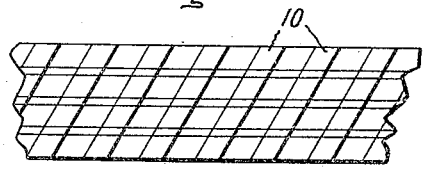
Figure 3:
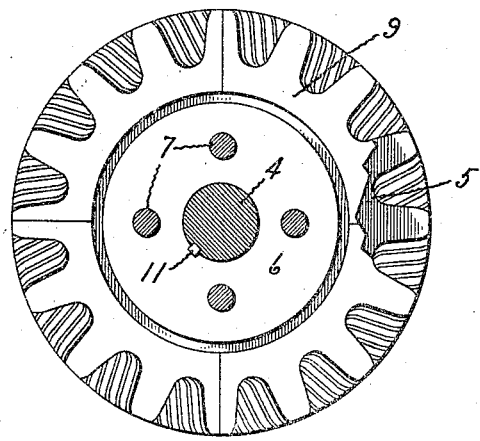

In the accompanying drawing which illustrates a gear made in accordance with my invention, Figure 1 is an axial section of a gear showing non-metallic and destructible spacing devices between plates; Fig. 2 is a developed plan view of a part of a cut gear; Fig. 3 is a cross-sectional view of a modification showing a removable or destructible metal spacing device, and Fig. 4 shows a slight modification of the permanent spacing device.

Figure 4:

In Fig. 1, 4 indicates the rotating shaft or other support. On this support are mounted elastic metal plates 5 of suitable diameter and thickness, said plates being keyed or otherwise secured. Between the plates are permanent spacing rings or devices 6 which will usually be formed of metal. They may be formed integral with the plates or laminations, as in Fig. 4, or they may be separate. The latter arrangement in some cases is desirable because it reduces the machine work. The plates and permanent spacing devices are secured by the clamping bolts 7 which pass through the end heads 8. Surrounding the permanent spacing devices are temporary and destructible spacing devices 9. When made of paper, which is the cheapest and simplest arrangement, they are made in ring form and roughly punched to size. After the blank has been completed diagonal or helical teeth 10 are cut thereon by a gear cutting machine. This operation leaves some of the paper between the plates and also between the teeth on the adjacent plates. The paper is afterward removed in any desired manner as aforesaid leaving small open spaces between the teeth on one plate and those on the adjacent plate. The thickness of the paper will be determined by the amount of flexibility the finished gear is to have. In any event sufficient space should be left after the spacing devices are destroyed to permit the teeth to yield slightly in a direction parallel to the gear axis as the teeth of the co-operating helical gear pass over them. The point or region of tooth pressure of one gear on the other gradually progresses from one side of the gear to the other by a screw-like action as distinguished from a complete contact along the whole face of the gear as with ordinary gearing of the epicycloidal or involute type.

In Fig. 3 is shown a modification of the destructible or removable spacing device in which 4 indicates a shaft or support and 5 one of the several plates. Between the plates are permanent spacing rings 6 which closely surround the shaft, said rings and plates being held by the key 11. Extending through the rings and plates are clamping bolts 7. Surrounding the permanent rings are removable or destructible metal spacing rings 9 made in the form of segments with abutting joints. The rings 9 serve to back up the teeth during the tooth cutting operation, after which they may be removed in any suitable manner as by rotating the gear at a sufficiently high speed to cause them to be thrown out by centrifugal force. The fact that the pressure due to the clamping means, such as the bolts 7, is applied in a region relatively near the shaft means that the temporary spacing devices are not so firmly held and hence can be removed in the manner stated.

What I claim as new and desire to secure by Letters Patent of the United States, is:—

1. The method of forming gears which comprises assembling into a solid mass a number of plates on a support with spacing means between adjacent plates, cutting the teeth, and removing a portion of the spacing means between the plates.

2. The method of forming gears which comprises assembling a number of elastic plates on a support with permanent and also with removable spacing devices between the plates for temporarily backing up the teeth, cutting the teeth and removing said removable spacing devices.

3. The method of forming gears which comprises assembling a number of elastic plates on a support in permanent relation with permanent and also with destructible spacing devices between the plates, finishing the blank thus formed, cutting the teeth and subsequently destroying the destructible spacing devices.

4. The method of forming gears which comprises assembling a number of elastic plates on a shaft or support with permanent spacing means between the plates and also with temporary paper spacing means between said plates which circumferentially surround the permanent means, cutting helical teeth on the blank thus formed and then destroying the paper spacing means.

In witness whereof, I have hereunto set my hand this 17th day of February, 1914.

KARL ALQUIST.

Witnesses:
 HELEN ORFORD,
 BENJAMIN B. HULL.